(12) United States Patent
Cho et al.

(10) Patent No.: US 11,915,147 B2
(45) Date of Patent: *Feb. 27, 2024

(54) LARGE MODEL SUPPORT IN DEEP LEARNING

(71) Applicant: International Business Machines Corporation, Armonk, NY (US)

(72) Inventors: Minsik Cho, Austin, TX (US); Ulrich Alfons Finkler, Mahopac, NY (US); Vladimir Zolotov, Putnam Valley, NY (US); David S. Kung, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,203

(22) Filed: Oct. 20, 2022

(65) Prior Publication Data

US 2023/0064057 A1 Mar. 2, 2023

Related U.S. Application Data

(63) Continuation of application No. 16/180,864, filed on Nov. 5, 2018, now Pat. No. 11,526,759.

(51) Int. Cl.
*G06F 15/82* (2006.01)
*G06N 3/084* (2023.01)
(Continued)

(52) U.S. Cl.
CPC ......... *G06N 3/084* (2013.01); *G06F 13/4282* (2013.01); *G06N 3/04* (2013.01)

(58) Field of Classification Search
CPC ....... G06N 3/084; G06N 3/04; G06F 13/4282
See application file for complete search history.

(56) References Cited

U.S. PATENT DOCUMENTS 9,607,355 B2 * 3/2017 Zou .................. G06F 9/522
9,912,349 B1 3/2018 Ouyang et al.
(Continued)

FOREIGN PATENT DOCUMENTS

CN        1627251 A    6/2005
CN    104899641 A    9/2015
(Continued)

OTHER PUBLICATIONS

Notice of Reasons for Refusal received for Japanese Patent Application Serial No. 2021-521954 dated Jun. 27, 2023, 8 pages.
(Continued)

*Primary Examiner* — Cheng Yuan Tseng
(74) *Attorney, Agent, or Firm* — Amin, Turocy & Watson, LLP

(57) ABSTRACT

Techniques that facilitate model support in deep learning are provided. In one example, a system includes a graphics processing unit and a central processing unit memory. The graphics processing unit processes data to train a deep neural network. The central processing unit memory stores a portion of the data to train the deep neural network. The graphics processing unit provides, during a forward pass process of the deep neural network that traverses through a set of layers for the deep neural network from a first layer of the set of layers to a last layer of the set of layers that provides a set of outputs for the deep neural network, input data for a layer from the set of layers for the deep neural network to the central processing unit memory.

20 Claims, 10 Drawing Sheets

(51) Int. Cl.
  *G06F 13/42* (2006.01)
  *G06N 3/04* (2023.01)

(56) References Cited

U.S. PATENT DOCUMENTS

| | | | | |
|---|---|---|---|---|
| 10,157,045 | B2* | 12/2018 | Venkataramani | G06N 3/048 |
| 10,169,084 | B2* | 1/2019 | John | G06N 3/084 |
| 10,282,809 | B2* | 5/2019 | Jin | G06T 1/20 |
| 10,319,374 | B2* | 6/2019 | Catanzaro | G06N 3/044 |
| 10,540,957 | B2* | 1/2020 | Hannun | G06N 3/045 |
| 10,728,091 | B2* | 7/2020 | Zhao | G06N 3/08 |
| 10,783,018 | B2* | 9/2020 | Cui | G06F 9/547 |
| 10,936,969 | B2* | 3/2021 | Patel | G06N 5/01 |
| 10,949,746 | B2* | 3/2021 | Haruki | G06N 3/045 |
| 11,003,982 | B2* | 5/2021 | Baker | G06N 3/084 |
| 11,017,291 | B2* | 5/2021 | Lewis | G06N 3/045 |
| 11,055,557 | B2* | 7/2021 | Chatterjee | G06F 16/3334 |
| 11,164,079 | B2* | 11/2021 | Le | G06N 3/063 |
| 11,200,664 | B2* | 12/2021 | Yuh | G06T 7/11 |
| 11,270,201 | B2* | 3/2022 | Sridharan | G06N 3/084 |
| 11,526,759 | B2* | 12/2022 | Cho | G06N 3/084 |
| 2005/0125369 | A1 | 6/2005 | Buck et al. | |
| 2016/0342888 | A1 | 11/2016 | Yang et al. | |
| 2017/0116520 | A1 | 4/2017 | Min et al. | |
| 2018/0032911 | A1 | 2/2018 | Yamazaki et al. | |
| 2018/0121806 | A1 | 5/2018 | Haruki et al. | |
| 2019/0205737 | A1* | 7/2019 | Bleiweiss | G06N 3/063 |
| 2019/0325302 | A1* | 10/2019 | Savic | G06N 3/08 |
| 2021/0182077 | A1* | 6/2021 | Chen | G06N 3/02 |

FOREIGN PATENT DOCUMENTS

| | | |
|---|---|---|
| CN | 105224502 A | 1/2016 |
| CN | 106203619 A | 12/2016 |
| CN | 106339753 A | 1/2017 |
| CN | 107341127 A | 11/2017 |
| CN | 107341547 A | 11/2017 |
| CN | 107463448 A | 12/2017 |
| CN | 107622305 A | 1/2018 |
| WO | 2018/142764 A1 | 8/2018 |

OTHER PUBLICATIONS

Office Action received for Chinese Patent Application Serial No. 201980069430.X dated Nov. 25, 2022, 19 pages.
Anonymous, "Finding fine-grained detector from trained deep learning models", IP.com No. PCOM000242472D, IP.com Electronic Publication, Jul. 17, 2015, 4 pages.
Anonymous, "Method and System for Smarter Resource Management for Distributed Deep Learning", IP.com No. IPCOM000248258D, IP.com Electronic Publication, Nov. 11, 2016, 5 pages.
Anonymous, "Automatically Scaling Multi-Tenant Machine Learning", IP.com No. IPCOM000252098D, IP.com Electronic Publication, Dec. 15, 2017, 35 pages.
Cui et al., "Scalable deep learning on distributed GPUs with a GPU-specialized parameter server", CMU-PDL-15-107, Oct. 2015, 23 pages.
Nvidia, "GPU-Based Deep Learning Inference: A Performance and Power Analysis", Nov. 2015, 12 pages.
Shirahata et al., "Memory Reduction Method for Deep Neural Network Training," 2016 IEEE International Workshop on Machine Learning for Signal Processing, Sep. 13-16, 2016, 6 pages.
Dean et al., "Large Scale Distributed Deep Networks", Last Accessed: Nov. 5, 2018, 11 pages.
Rhu et al., "vDNN: Virtualized Deep Neural Networks for Scalable, Memory-Efficient Neural Network Design", 2016 EEE, 13 pages.
Meng et al., "Training Deeper Models by GPU Memory Optimization on TensorFlow", 31st Conference on Neural Information Processing Systems (NIPS 2017), Long Beach, CA, USA, 2017, 8 pages.
Szegedy et al., "Going deeper with convolutions", arXiv:1409.4842v1 [cs.CV], Sep. 17, 2014, 12 pages.
International Search Report and Written Opinion received for PCT Application Serial No. PCT/IB2019/059294 dated Feb. 14, 2020, 9 pages.
Non Final Office Action received for U.S. Appl. No. 16/180,864 dated Apr. 14, 2022, 25 pages.
Examination Report received for GB Patent Application Serial No. 2101709.0 dated May 9, 2022, 4 pages.
Office Action received for Chinese Patent Application Serial No. 201980069430.X dated Sep. 16, 2022, 11 pages.
Decision to Grant a Patent received for Japanese Patent Application Serial No. 2021-521954 dated Oct. 3, 2023, 5 pages.
Office action received for German Patent Application Serial No. 112019004391.9 dated Nov. 27, 2023, 6 pages.
Judd et al., "Reduced-precision Strategies for Bounded Memory in Deep Neural Nets", ICLR, arXiv: 1511.05236v4, Jan. 8, 2016, 12 pages.

* cited by examiner

LARGE MODEL SUPPORT IN DEEP LEARNING

BACKGROUND

The subject disclosure relates to computer architecture, and more specifically, to deep learning systems. Deep learning is a machine learning technique that employs a training process associated with a network of processing layers (e.g., an input layer, a set of hidden layers and/or an output layer) to determine previously unknown features, classifications and/or patterns associated with data provided to the network of processing layers. Deep learning is often employed in technical fields such as, for example, speech recognition, image recognition, video processing, text analysis, graphical modeling, data analysis, bioinformatics, technical systems associated with unstructured data, and/or other technical applications. Data provided to the network of processing layers can include a training set (e.g., a set of data with known classifications that is employed for the training process) that is employed at a beginning of the training process. Utilizing the training set, the network of processing layers can perform iterative processing stages in which data generated during a particular processing stage is determined from data generated during one or more previous processing stages. During a processing stage, processing layers can independently generate data based on input data and/or previously learned data. In certain implementations, a graphics processing unit can be employed to execute deep learning. For instance, a graphics processing unit can be employed to execute the network of processing layers. In one example, Yang et al. (U.S. Patent Publication No. 2016/0342888) discloses "techniques that improve performance of CNN systems through the effect of improved memory efficiencies for CNNs operating on GPUs." However, a graphics processing unit generally has limited on-board memory. Furthermore, a graphics processing unit generally cannot accommodate certain types of deep learning networks (e.g., a large deep learning network, a complex deep learning network, etc.). As such, deep learning associated with a graphics processing unit can be improved.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate model support in deep learning are described.

According to an embodiment, a system can comprise a graphics processing unit and a central processing unit memory. The graphics processing unit can process data to train a deep neural network. The central processing unit memory can store a portion of the data to train the deep neural network. The graphics processing unit can provide, during a forward pass process of the deep neural network that traverses through a set of layers for the deep neural network from a first layer of the set of layers to a last layer of the set of layers that provides a set of outputs for the deep neural network, input data for a layer from the set of layers for the deep neural network to the central processing unit memory. The system can provide various advantages as compared to conventional deep learning techniques. In certain embodiments, the system can facilitate improved performance for a deep learning process associated with the deep neural network. In an embodiment, a central processing unit associated with the central processing unit memory can provide, during a backward pass process of the deep neural network that traverses through the set of layers for the deep neural network from the last layer of the set of layers to the first layer of the set of layers, the input data to the graphics processing unit. In another embodiment, the graphics processing unit can store, during the forward pass process, output data from the layer of the deep neural network in a memory associated with the graphics processing unit. In yet another embodiment, the graphics processing unit can provide, during a backward pass process of the deep neural network, gradient data from a layer of the deep neural network to the central processing unit memory. In yet another embodiment, the graphics processing unit can receive, during a backward pass process of the deep neural network, parameter data for a layer of the deep neural network from the central processing unit memory. In certain embodiments, the graphics processing unit can provide the input data to the central processing unit memory via a compression scheme. In certain embodiments, the graphics processing unit can provide the input data to the central processing unit memory via a half-precision floating-point format. In certain embodiments, the graphics processing unit can be coupled to the central processing unit memory via a serial multi-lane communication link. In certain embodiments, the central processing unit memory can store the portion of the data to facilitate improved processing performance for the graphics processing unit.

According to another embodiment, a computer-implemented method is provided. The computer-implemented method can comprise processing, by a graphics processing unit, data to train a deep neural network that comprises a set of layers. The computer-implemented method can also comprise providing, by the graphics processing unit, input data for a layer from the set of layers to a central processing unit memory during a forward pass process of the deep neural network that traverses through a set of layers from a first layer of the set of layers to a last layer of the set of layers that provides a set of outputs for the deep neural network. The computer-implemented method can provide various advantages as compared to conventional deep learning techniques. In certain embodiments, the computer-implemented method can facilitate improved performance for a deep learning process associated with the deep neural network. In an embodiment, the computer-implemented method can also comprise receiving, by the graphics processing unit, the input data from the central processing unit memory during a backward pass process of the deep neural network that traverses through the set of layers for the deep neural network from the last layer of the set of layers to the first layer of the set of layers. In another embodiment, the computer-implemented method can also comprise storing, by the graphics processing unit and during the forward pass process, output data from the layer of the deep neural network in a memory associated with the graphics processing unit. In yet another embodiment, the computer-implemented method can also comprise providing, by the graphics processing unit and during a backward pass process of the deep neural network, gradient data from a layer of the deep neural network to the central processing unit memory. In yet another embodiment, the computer-implemented method can also comprise receiving, by the graphics processing unit and during a backward pass process of the deep neural network, parameter data for a layer of the deep neural network from the central processing unit memory. In certain embodiments, the providing can comprise providing the input data to the central processing unit memory via a compression scheme. In certain embodiments, the providing comprises providing the input data to the central processing unit memory via a half-precision floating-point format. In certain embodiments, the providing comprises facilitating improved processing performance for the graphics processing unit.

According to yet another embodiment, a computer-implemented method is provided. The computer-implemented method can comprise receiving, by a central processing unit, at least a portion of data to train a deep neural network that comprises a set of layers. The computer-implemented method can also comprise storing, by the central processing unit, at least the portion of the data in a memory associated with the central processing unit. Furthermore, the computer-implemented method can comprise providing, by the central processing unit, at least the portion of the data to a graphics processing unit associated with the deep neural network during a backward pass process of the deep neural network that traverses through the set of layers for the deep neural network from a last layer of the set of layers that provides a set of outputs for the deep neural network to a first layer of the set of layers. The computer-implemented method can provide various advantages as compared to conventional deep learning techniques. In certain embodiments, the computer-implemented method can facilitate improved performance for a deep learning process associated with the deep neural network. In an embodiment, the receiving can comprise receiving at least the portion of the data during a forward pass process of the deep neural network that traverses through a set of layers for the deep neural network from the first layer of the set of layers to the last layer of the set of layers. In another embodiment, the receiving can comprise receiving at least the portion of the data via a compression scheme.

According to yet another embodiment, a computer program product for model support in deep learning can comprise a computer readable storage medium having program instructions embodied therewith. The program instructions can be executable by a graphics processing unit and cause the graphics processing unit to process, by the graphics processing unit, data to train a deep neural network that comprises a set of layers. The program instructions can also cause the graphics processing unit to provide, by the graphics processing unit, input data for a layer from the set of layers to a central processing unit memory during a forward pass process of the deep neural network that traverses through a set of layers from a first layer of the set of layers to a last layer of the set of layers that provides a set of outputs for the deep neural network. The computer program product can provide various advantages as compared to conventional deep learning techniques. In certain embodiments, the computer program product can facilitate improved performance for a deep learning process associated with the deep neural network. In an embodiment, the program instructions can also cause the graphics processing unit to receive, by the graphics processing unit, the input data from the central processing unit memory during a backward pass process of the deep neural network that traverses through the set of layers for the deep neural network from the last layer of the set of layers to the first layer of the set of layers. In another embodiment, the program instructions can also cause the graphics processing unit to store, by the graphics processing unit and during the forward pass process, output data from the layer of the deep neural network in a memory associated with the graphics processing unit.

According to yet another embodiment, a computer program product for model support in deep learning can comprise a computer readable storage medium having program instructions embodied therewith. The program instructions can be executable by a central processing unit and cause the central processing unit to receive, by a central processing unit, at least a portion of data to train a deep neural network that comprises a set of layers. The program instructions can also cause the central processing unit to store, by the central processing unit, at least the portion of the data in a memory associated with the central processing unit. The program instructions can also cause the central processing unit to provide, by the central processing unit, at least the portion of the data to a graphics processing unit associated with the deep neural network during a backward pass process of the deep neural network that traverses through the set of layers for the deep neural network from a last layer of the set of layers that provides a set of outputs for the deep neural network to a first layer of the set of layers. The computer program product can provide various advantages as compared to conventional deep learning techniques. In certain embodiments, the computer program product can facilitate improved performance for a deep learning process associated with the deep neural network. In an embodiment, the program instructions can also cause the graphics processing unit to receive, by the central processing unit, at least the portion of the data during a forward pass process of the deep neural network that traverses through a set of layers for the deep neural network from the first layer of the set of layers to the last layer of the set of layers.

DETAILED DESCRIPTION

Figure 1:
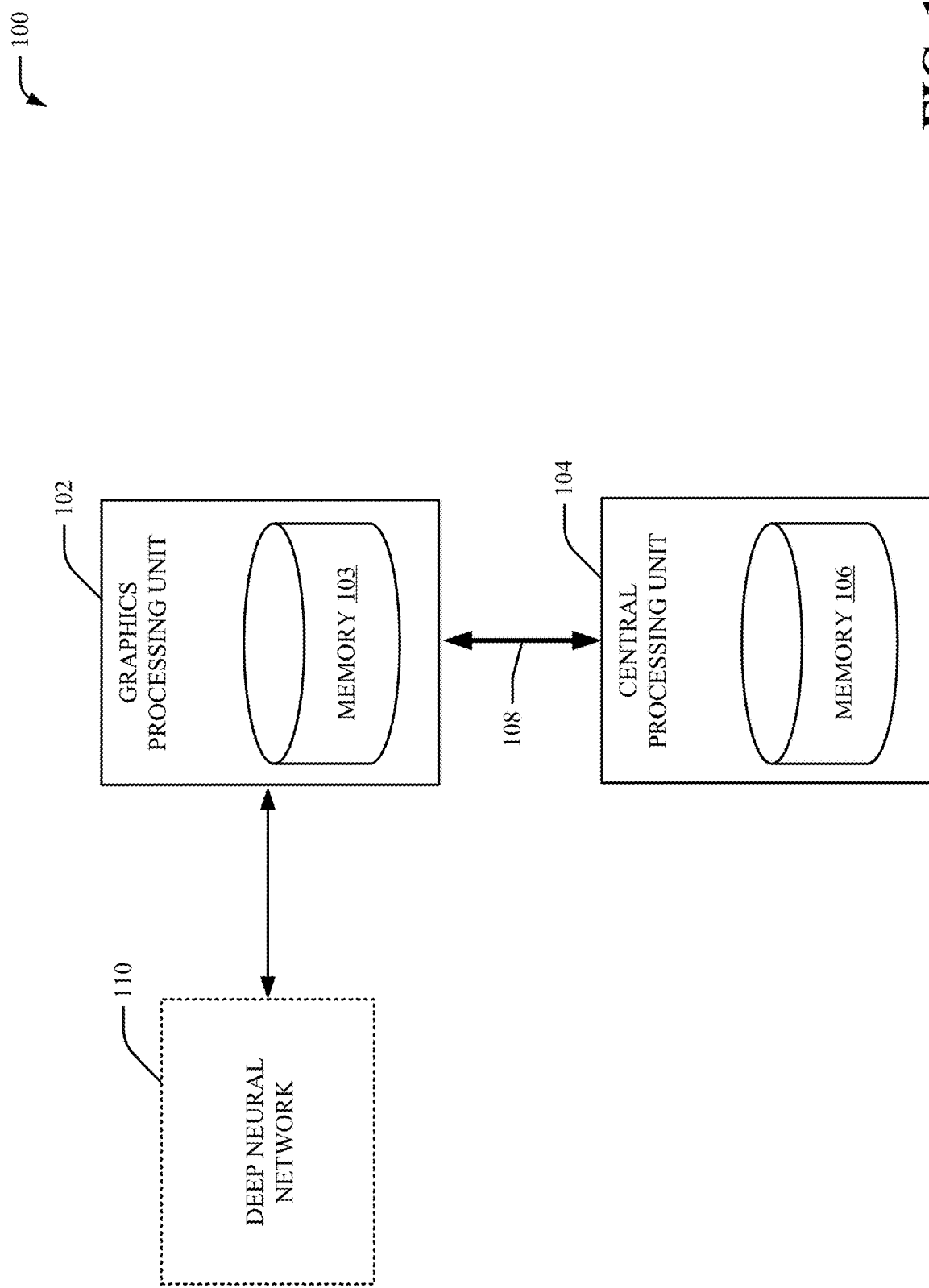
FIG. 1 illustrates an example, non-limiting system to facilitate model support in deep learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Deep learning is a machine learning technique that employs a training process associated with a network of processing layers (e.g., an input layer, a set of hidden layers and/or an output layer) to determine previously unknown features, classifications and/or patterns associated with data provided to the network of processing layers. Deep learning is often employed in technical fields such as, for example, speech recognition, image recognition, video processing, text analysis, graphical modeling, data analysis, bioinformatics, technical systems associated with unstructured data, and/or other technical applications. Data provided to the network of processing layers can include a training set (e.g., a set of data with known classifications that is employed for the training process) that is employed at a beginning of the training process. Utilizing the training set, the network of processing layers can perform iterative processing stages in which data generated during a particular processing stage is determined from data generated during one or more previous processing stages. During a processing stage, processing layers can independently generate data based on input data and/or previously learned data. In an embodiment, a graphics processing unit can be employed to execute deep learning. For example, a graphics processing unit can be employed to execute the network of processing layers. However, a graphics processing unit generally has limited on-board memory. Furthermore, a graphics processing unit generally cannot accommodate certain types of deep learning networks (e.g., a large deep learning network, a complex deep learning network, etc.). As such, deep learning associated with a graphics processing unit can be improved.

To address these and/or other problems associated with conventional deep learning techniques, deep learning that employs a graphics processing unit, and/or other conventional technologies, embodiments described herein include systems, computer-implemented methods, and computer program products for model support in deep learning. In an aspect, graphics processing unit can be employed for deep learning to provide model support. The model can be, for example, a deep learning model. Furthermore, a host memory can additionally be employed to provide the model support. The host memory can be, for example, a central processing unit memory. In another example, the host memory can be another graphics processing unit memory associated with a different graphics processing unit. However, it is to be appreciated that the host memory can be a different type of memory. The host memory can be communicatively coupled to the graphics processing unit. The host memory can be employed as a cache for deep learning associated with the graphics processing unit. For example, the host memory can be employed as a cache to store at least a portion of data associated with training of a deep learning model for a deep learning network executed by the graphics processing unit. In an embodiment, data from a forward pass associated with a deep learning network executed by the graphics processing unit can be reused in a backward pass associated with the deep learning network executed by the graphics processing unit. The data from the forward pass can be stored in the host memory. Furthermore, during the backward pass, the data stored in the host memory can be provided to the graphics processing unit. The forward pass can be a forward pass process of the deep learning network that traverses through a set of layers for the deep neural network from a first layer of the set of layers to a last layer of the set of layers that provides a set of outputs for the deep learning network. The backward pass can be a backward pass process of the deep learning network that traverses through the set of layers for the deep neural network from the last layer of the set of layers to the first layer of the set of layers. In another embodiment, after the backward pass is completed, at least a portion of the data can be discarded from the host memory. Additionally, in certain embodiments, the graphics processing unit can provide the data to the host memory via a compression scheme. Accordingly, processing performance of the graphics processing unit can be improved, computing bottlenecks of the graphics processing unit can be reduced and/or processing efficiency of the graphics processing unit can be improved. Furthermore, a batch size (e.g., a number of training elements for a forward pass or a backward pass) for a deep learning network and/or an amount of data processed by a deep learning network can be increased. Moreover, an amount of time to perform deep learning associated with a deep learning network can be reduced.

FIG. 1 illustrates an example, non-limiting system 100 that facilitates model support in deep learning in accordance with one or more embodiments described herein. In various embodiments, the system 100 can be a deep learning system associated with technologies such as, but not limited to, deep learning technologies, machine learning technologies, artificial intelligence technologies, collaborative filtering technologies, recommendation system technologies, signal processing technologies, word embedding technologies, topic model technologies, image processing technologies, data analysis technologies, search engine technologies, image recognition technologies, speech recognition technologies, model reduction technologies, iterative linear solver technologies, data mining technologies, healthcare technologies, pharmaceutical technologies, biotechnology technologies, finance technologies, chemistry technologies, material discovery technologies, vibration analysis technologies, geological technologies, industrial technologies, aviation technologies, and/or other digital technologies.

The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized graphics processing unit, a specialized processor, a specialized central processing unit, etc.) for carrying out defined tasks related to deep learning. The system 100 and/or components of the system 100 can be employed to solve new problems that arise through advancements in technologies mentioned above, computer architecture, deep learning architecture and/or the like. One or more embodiments of the system 100 can provide technical improvements to deep learning systems, machine learning systems, artificial intelligence systems, collaborative filtering systems, recommendation systems, signal processing systems, word embedding systems, topic model systems, image processing systems, data analysis systems, search engine systems, image recognition systems, speech recognition systems, model reduction systems, iterative linear solver systems, data mining systems, healthcare systems, pharmaceutical systems, biotechnology systems, finance systems, chemistry systems, material discovery systems, vibration analysis systems, geological systems, industrial systems, aviation systems, and/or other digital systems. One or more embodiments of the system 100 can also provide technical improvements to a graphics processing unit by improving processing performance of the graphics processing unit, reducing computing bottlenecks of the graphics processing unit, improving processing efficiency of the graphics processing unit, and/or reducing an amount of time for the graphics processing unit to perform a deep learning process.

In the embodiment shown in FIG. 1, the system 100 can include a graphics processing unit 102 and a central processing unit 104. The graphics processing unit 102 can be a specialized hardware processor configured to repeatedly perform one or more operations. The graphics processing unit 102 can also be specialized to perform display functions and/or graphics processing. Furthermore, the graphics processing unit 102 can include a plurality of processor cores to facilitate repeatedly performing the one or more operations. The central processing unit 104 can be a hardware processor configured to execute a set of processing threads. The graphics processing unit 102 can be configured to process data at a faster rate than the central processing unit 104. Furthermore, the central processing unit 104 can include at least one processor core to facilitate execution of the set of processing threads. The central processing unit 104 can include a memory 106. The memory 106 can be, for example, a central processing unit memory. For instance, the memory 106 can be a central processing unit cache configured to store copies of data frequency employed by the central processing unit 104. In an embodiment, the graphics processing unit 102 can be communicatively coupled to the central processing unit via a communication link 108. For example, the graphics processing unit 102 can be communicatively coupled to the memory 106 of the central processing unit via communication link 108. The communication link 108 can be, for example, a serial multi-lane communication link.

The graphics processing unit 102 can process data to train a deep neural network 110. For example, the graphics processing unit 102 can process data to configure the deep neural network 110 to perform a particular task (e.g., identify a particular classification) associated with data. In an aspect, the graphics processing unit 102 can modify and/or determine a set of weights for the deep neural network 110 during the training of the deep neural network 110. The deep neural network 110 can be an artificial neural network that includes a set of layers. The set of layers of the deep neural network 110 can include, for example, an input layer, a set of hidden layers, and an output layer. The input layer of the deep neural network 110 can include a set of artificial neurons that process data inputted into the deep neural network 110. In an aspect, the input layer of the deep neural network 110 can process data inputted into the deep neural network 110 based on a set of weights. The set of hidden layers of the deep neural network 110 can be located between the input layer and the output layer. The set of hidden layers of the deep neural network 110 can include one or more hidden layers. Furthermore, the set of hidden layers of the deep neural network 110 can include a set of artificial neurons that process data provided by the input layer. In an aspect a hidden layer from the set of hidden layers can process data provided by a previous hidden layer in the set of layers. The output layer of the deep neural network 110 can include a set of artificial neurons that process data provided by the set of hidden layers. Furthermore, the output layer of the deep neural network 110 can provide a set of outputs for the deep neural network 110. In another aspect, the deep neural network 110 can be a deep learning model that includes a logic structure that analyzes data similar to a human brain structure.

The memory 106 of the central processing unit 104 can store at least a portion of the data employed, analyzed and/or generated to train the deep neural network 110. For example, the memory 106 of the central processing unit 104 can store at least a portion of the data employed, analyzed and/or generated by the graphics processing unit 102. The graphics processing unit 102 can provide at least a portion of the data to the memory 106 of the central processing unit 104 during training of the deep neural network 110. In certain embodiments, the graphics processing unit 102 can provide at least a portion of the data to the memory 106 of the central processing unit 104 via a compression scheme. In certain embodiments, the graphics processing unit 102 can provide at least a portion of the data to the memory 106 of the central processing unit 104 via a half-precision floating-point format. Additionally or alternatively, the graphics processing unit 102 can receive data stored in the memory 106 of the central processing unit 104 during training of the deep neural network 110. In certain embodiments, the graphics processing unit 102 can receive data stored the memory 106 of the central processing unit 104 via a compression scheme. In certain embodiments, the graphics processing unit 102 can receive data stored in the memory 106 of the central processing unit 104 via a half-precision floating-point format.

In an embodiment, the graphics processing unit 102 can provide, during a forward pass process of the deep neural network 110 executed by the graphics processing unit 102, input data for a layer from the set of layers for the deep neural network 110 to the memory 106 of the central processing unit 104. The forward pass process can be a process during training of the deep neural network 110 that traverses through the set of layers for the deep neural network 110 from a first layer of the set of layers to a last layer of the set of layers that provides a set of outputs for the deep neural network 110. In certain embodiments, the graphics processing unit 102 can provide the input data to the memory 106 of the central processing unit 104 via a compression scheme. In certain embodiments, the graphics processing unit 102 can provide the input data to the memory 106 of the central processing unit 104 via a half-precision floating-point format. In another embodiment, the central processing unit 104 can provide, during a backward pass process of the deep neural network 110 executed by the graphics processing unit 102, the input data stored in the memory 106 to the graphics processing unit 102. The input data stored in the memory 106 can be employed by the deep neural network 110 during the backward pass process. The backward pass process can be a process during training of the deep neural network 110 that traverses through the set of layers for the deep neural network 110 from the last layer of the set of layers to the first layer of the set of layers. In certain embodiments, the graphics processing unit 102 can store, during the forward pass process, output data from the layer of the deep neural network 110 in a memory 103 of the graphics processing unit 102. For example, the memory 103 of the graphics processing unit 102 can temporarily store the output data from the layer until the deep neural network 110 employs the output data for further processing associated with another layer of the deep neural network 110. In certain embodiments, the graphics processing unit 102 can provide, during a backward pass process of the deep neural network 110, gradient data from a layer of the deep neural network 110 to the memory 106 of the central processing unit 104. For example, the memory 106 of the central processing unit 104 can temporarily store the gradient data from the layer until the deep neural network 110 employs the gradient data for further processing associated with another layer of the deep neural network 110. In certain embodiments, the graphics processing unit 102 can receive, during a backward pass process of the deep neural network 110, parameter data for a layer of the deep neural network 110 from the memory 106 of the central processing unit 104. For example, the memory 106 of the central processing unit 104 can temporarily store the parameter data from the layer until the deep neural network 110 employs the parameter data for further processing associated with another layer of the deep neural network 110.

It is to be appreciated that the graphics processing unit 102 and/or the central processing unit 104 perform a deep learning process that cannot be performed by a human (e.g., is greater than the capability of a single human mind). For example, an amount of data processed, a speed of processing of data and/or data types processed by the graphics processing unit 102 and/or the central processing unit 104 over a certain period of time with respect to the deep learning process can be greater, faster and different than an amount, speed and data type that can be processed by a single human mind over the same period of time. The graphics processing unit 102 and/or the central processing unit 104 can also be fully operational towards performing one or more other functions (e.g., fully powered on, fully executed, etc.) while also performing the above-referenced matrix factorization process. Moreover, a deep learning model generated by the graphics processing unit 102 can include information that is impossible to obtain manually by a user. For example, an amount of information included in a deep learning model generated by the graphics processing unit 102 and/or a variety of information included in a deep learning model generated by the graphics processing unit 102 can be more complex than information obtained manually by a user.

In certain embodiments, aspects of the graphics processing unit 102 and/or the central processing unit 104 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the graphics processing unit 102 and/or the central processing unit 104 can also include memory that stores computer executable components and instructions. Furthermore, the graphics processing unit 102 and/or the central processing unit 104 can include and/or be implemented as a processor to facilitate execution of the instructions (e.g., computer executable components and corresponding instructions) by the graphics processing unit 102 and/or the central processing unit 104.

Additionally, it is to be appreciated that the system 100 can provide various advantages as compared to conventional deep learning techniques. The system 100 can also provide various solutions to problems associated with conventional deep learning techniques. For instance, an amount of time to perform a deep learning process can be reduced by employing the system 100. Furthermore, an amount of computational resources employed to perform a deep learning process can be reduced by employing the system 100. Accuracy of a deep learning process can also be improved by employing the system 100. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 100.

Figure 2:
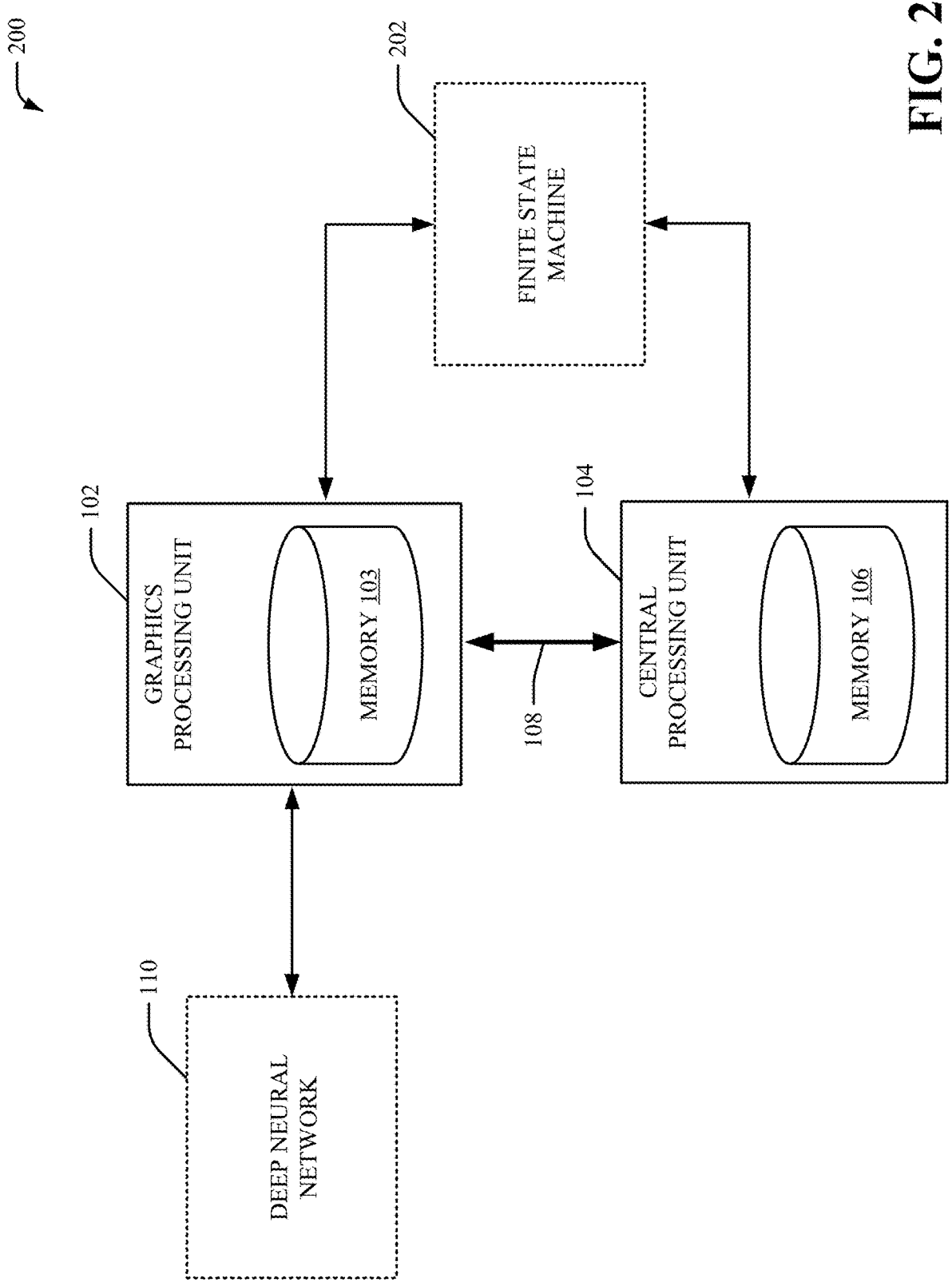
FIG. 2 illustrates another example, non-limiting system to facilitate model support in deep learning in accordance with one or more embodiments described herein.

FIG. 2 illustrates an example, non-limiting system 200 in accordance with one or more embodiments described herein. Repetitive description of like elements employed in other embodiments described herein is omitted for sake of brevity.

The system 200 can include the graphics processing unit 102, the central processing unit 104, the deep neural network 110 and/or a finite state machine 202. In an embodiment, the central processing unit 104 can include the memory 106. Additionally, in certain embodiments, the graphics processing unit 102 can include the memory 103. The finite state machine 202 can be employed to control storage and/or transmission of data during training of the deep neural network 110. For instance, the finite state machine 202 can be employed to support the deep neural network 110. In an aspect, the finite state machine 202 can control transmission of data associated with the deep neural network 110 to the memory 106 of the central processing unit 104. Additionally or alternatively, the finite state machine 202 can control transmission of data stored in the memory 106 to the graphics processing unit 102. Additionally or alternatively, the finite state machine 202 can control storage of data in the memory 103 of the graphics processing unit 102. Additionally or alternatively, the finite state machine 202 can control storage of data in the memory 106 of the central processing unit 104. In another aspect, the finite state machine 202 can determine whether the memory 106 of the central processing unit 104 should be employed as a cache memory for the graphics processing unit 102 during training of the deep neural network 110. In yet another aspect, the finite state machine 202 can determine whether to store data in the memory 106 of the central processing unit 104 in response to a determination that a particular layer of the deep neural network 110 is finished processing. In one embodiment, the finite state machine 202 can be executed by a processor separate from the graphics processing unit 102 and the central processing unit 104. In another embodiment, the finite state machine 202 can be executed by the graphics processing unit 102. In yet another embodiment, the finite state machine 202 can be executed by the central processing unit 104. Furthermore, in one embodiment, the finite state machine 202 can be stored in a memory separate from the memory 103 and the memory 106. In another embodiment, the finite state machine 202 can be stored in the memory 103. In yet another embodiment, the finite state machine 202 can be stored in the memory 106.

Additionally, it is to be appreciated that the system 200 can provide various advantages as compared to conventional deep learning techniques. The system 200 can also provide various solutions to problems associated with conventional deep learning techniques. For instance, an amount of time to perform a deep learning process can be reduced by employing the system 200. Furthermore, an amount of computational resources employed to perform a deep learning process can be reduced by employing the system 200. Accuracy of a deep learning process can also be improved by employing the system 200. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 200.

Figure 3:
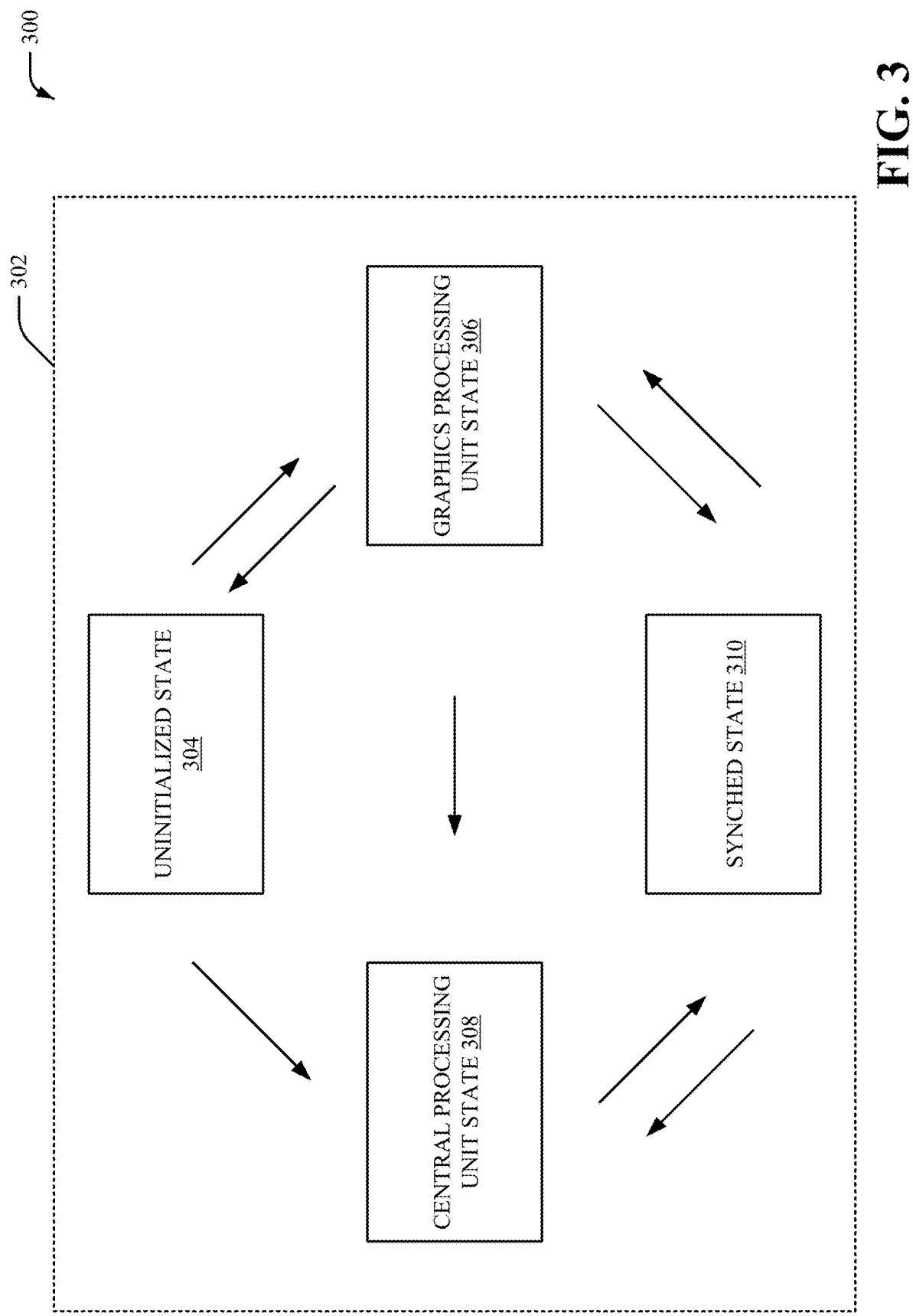
FIG. 3 illustrates an example, non-limiting system associated with a finite state machine in accordance with one or more embodiments described herein.

FIG. 3 illustrates an example, non-limiting system 300 in accordance with one or more embodiments described herein. Repetitive description of like elements employed in other embodiments described herein is omitted for sake of brevity.

The system 300 can include a finite state machine 302. In an example, the finite state machine 202 can correspond to the finite state machine 302. The finite state machine 302 can include an uninitialized state 304, a graphics processing unit state 306, a central processing unit state 308 and/or a synched state 310. The uninitialized state 304 can be a state in the finite state machine 302 where particular data employed to train the deep neural network 110 is uninitialized. For example, the graphics processing unit 102 and/or the central processing unit 104 can be uninitialized with respect to the particular data employed to train the deep neural network 110. The graphics processing unit state 306 can be a state in the finite state machine 302 where the graphics processing unit 102 comprises a latest version of particular data employed to train the deep neural network 110. The central processing unit state 308 can be a state in the finite state machine 302 where the central processing unit 104 comprises a latest version of particular data employed to train the deep neural network 110. The synched state 310 can be a state in the finite state machine 302 where the graphics processing unit 102 and the central processing unit 104 comprise a latest version of particular data employed to train the deep neural network 110. In an aspect, one or more transitions can occur between the uninitialized state 304, the graphics processing unit state 306, the central processing unit state 308 and/or the synched state 310. The one or more transitions can be one or more events that transition the finite state machine 302 between one or more states (e.g., the uninitialized state 304, the graphics processing unit state 306, the central processing unit state 308 and/or the synched state 310). In another aspect, the one or more transitions can occur between the uninitialized state 304, the graphics processing unit state 306, the central processing unit state 308 and/or the synched state 310 in response to a determination that processing of a layer (e.g., a hidden layer) of the deep neural network 110 is completed.

In an embodiment, the uninitialized state 304 can transition to the graphics processing unit state 306 in response to a determination that particular data employed to train the deep neural network 110 is to be stored in the memory 103 of the graphics processing unit 102. In another embodiment, the uninitialized state 304 can transition to the central processing unit state 308 in response to a determination that particular data employed to train the deep neural network 110 is to be stored in the memory 106 of the central processing unit 104. The graphics processing unit state 306 can store the particular data employed to train the deep neural network 110 in the memory 103 of the graphics processing unit 102 for a certain amount of time. For example, the graphics processing unit state 306 can store the particular data employed to train the deep neural network 110 in the memory 103 of the graphics processing unit 102 until a particular layer of the deep neural network 110 is finished being processed. In an aspect, the graphics processing unit state 306 can transmit the particular data employed to train the deep neural network 110 to the central processing unit 104. Furthermore, the finite state machine 302 can transition to the central processing unit state 308 from the graphics processing unit state 306 when the particular data employed to train the deep neural network 110 is transmitted to the central processing unit 104. The central processing unit state 308 can store the particular data employed to train the deep neural network 110 in the memory 106 of the central processing unit 104 for a certain amount of time. For example, the central processing unit state 308 can store the particular data employed to train the deep neural network 110 in the memory 106 of the central processing unit 104 until the particular data is needed by the graphics processing unit 102 for further processing associated with the deep neural network 110. In certain embodiments, the graphics processing unit state 306 can transition to the synched state 310 in response to a determination that the particular data is needed by the central processing unit 104. Furthermore, the synched state 310 can transition to the central processing unit state 308 in response to a determination that a particular layer of the deep neural network 110 is finished being processed. In certain embodiments, the graphics processing unit state 306 can discard the particular data from the memory 103 and/or can transition to the uninitialized state 304 in response to a determination that a particular layer of the deep neural network 110 is finished being processed. In certain embodiments, the central processing unit state 308 can transition to the synched state 310 in response to a determination that the particular data is needed by the graphics processing unit 102.

Additionally, it is to be appreciated that the system 300 can provide various advantages as compared to conventional deep learning techniques. The system 300 can also provide various solutions to problems associated with conventional deep learning techniques. For instance, an amount of time to perform a deep learning process can be reduced by employing the system 300. Furthermore, an amount of computational resources employed to perform a deep learning process can be reduced by employing the system 300. Accuracy of a deep learning process can also be improved by employing the system 300. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 300.

Figure 4:
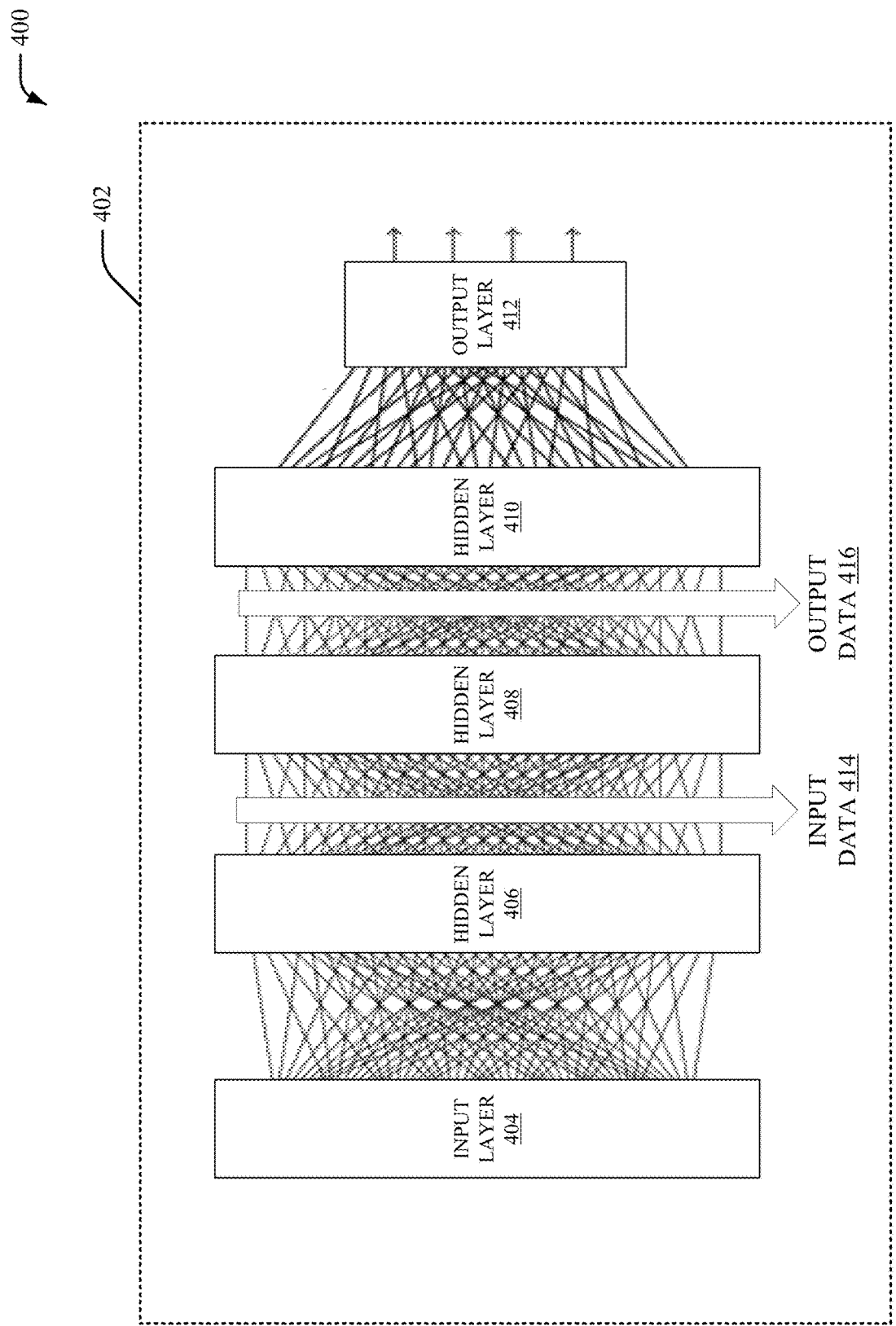
FIG. 4 illustrates an example, non-limiting system associated with a deep neural network in accordance with one or more embodiments described herein.

FIG. 4 illustrates an example, non-limiting system 400 in accordance with one or more embodiments described herein. Repetitive description of like elements employed in other embodiments described herein is omitted for sake of brevity.

The system 400 can include a deep neural network 402. In one example, the deep neural network 110 can correspond to the deep neural network 402. In an aspect, the deep neural network 402 can represent a deep learning model that includes a logic structure that analyzes data similar to a human brain structure. The deep neural network 402 can include an input layer 404, a hidden layer 406, a hidden layer 408, a hidden layer 410 and an output layer 412. In an embodiment shown in FIG. 4, the deep neural network 402 can be associated with a forward pass process that traverses through the deep neural network 402 in a forward direction through the input layer 404, the hidden layer 406, the hidden layer 408, the hidden layer 410 and the output layer 412. The input layer 404, the hidden layer 406, the hidden layer 408, the hidden layer 410 and the output layer 412 can be a set of layers for the deep neural network 402. The input layer 404 can include a set of artificial neurons that process data inputted into the deep neural network 402. In an aspect, the input layer 404 can process data inputted into the deep neural network 402 based on a set of weights. The hidden layer 406, the hidden layer 408 and the hidden layer 410 can be a set of hidden layers located between the input layer 404 and the output layer 412. The hidden layer 406 can include a set of artificial neurons that process data provided by the input layer 404. The hidden layer 408 can include a set of artificial neurons that process data provided by the hidden layer 406. The hidden layer 410 can include a set of artificial neurons that process data provided by the hidden layer 408. The output layer 412 can include a set of artificial neurons that process data provided by the hidden layer 410. Furthermore, the output layer 412 can provide a set of outputs for the deep neural network 402. In an aspect, input data 414 can be provided to the hidden layer 408. For example, the hidden layer 406 can provide the input data 414 to the hidden layer 408. Furthermore, output data 416 can be provided by the hidden layer 408. In an embodiment, the input data 414 can be copied to the memory 106 of the central processing unit 104. For example, the input data 414 can be copied to the memory 106 of the central processing unit 104 in response to a determination that processing of the hidden layer 408 is completed. Additionally or alternatively, the input data 414 can be copied to the memory 106 of the central processing unit 104 in response to a determination that the input data 414 is to be used by the deep neural network 402 during further processing of the deep neural network 402 (e.g., during a backward pass process of the deep neural network 402). In another embodiment, the output data 416 can be stored in the memory 103 of the graphics processing unit 102.

Additionally, it is to be appreciated that the system 400 can provide various advantages as compared to conventional deep learning techniques. The system 400 can also provide various solutions to problems associated with conventional deep learning techniques. For instance, an amount of time to perform a deep learning process can be reduced by employing the system 400. Furthermore, an amount of computational resources employed to perform a deep learning process can be reduced by employing the system 400. Accuracy of a deep learning process can also be improved by employing the system 400. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 400.

Figure 5:
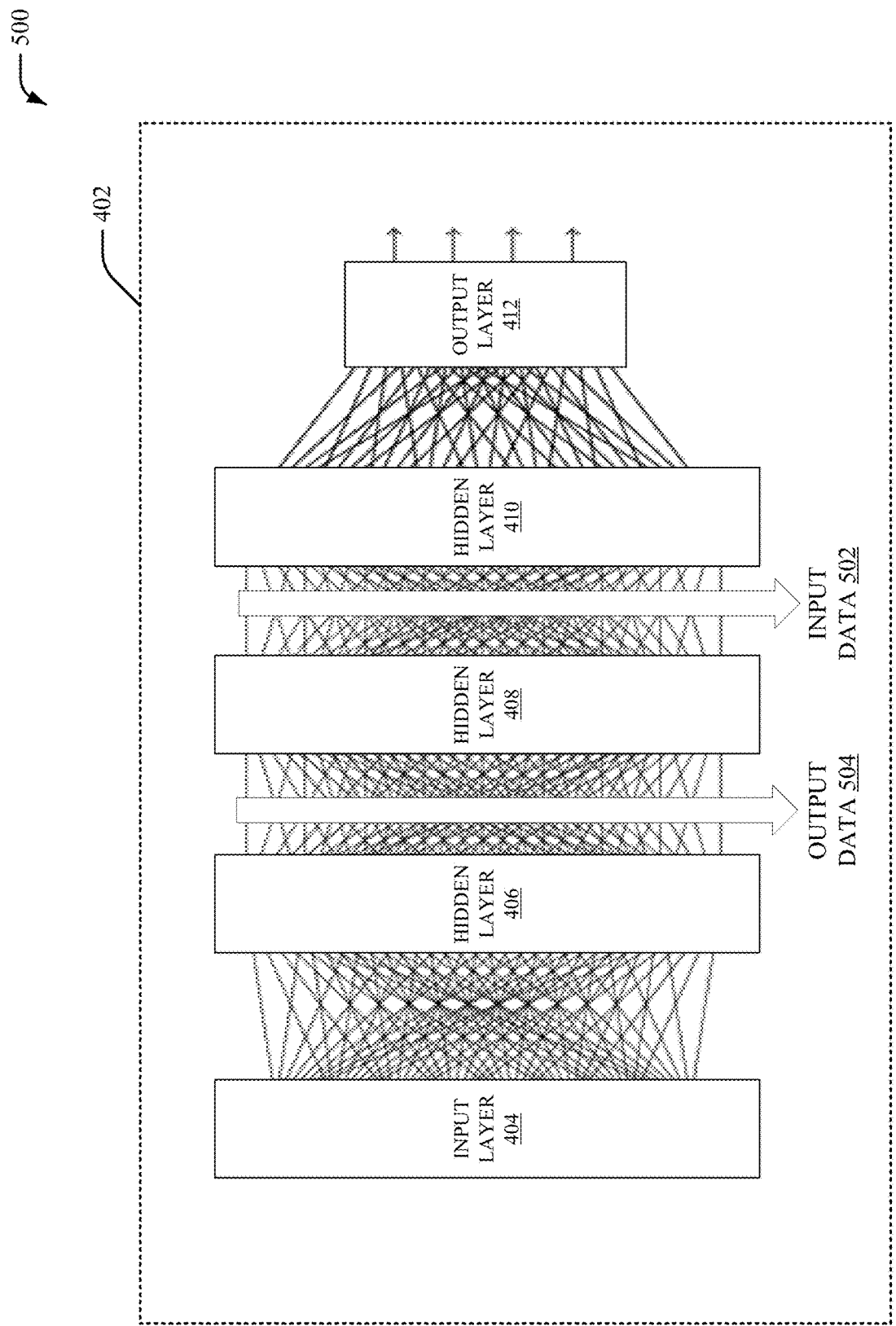
FIG. 5 illustrates another example, non-limiting system associated with a deep neural network in accordance with one or more embodiments described herein.

FIG. 5 illustrates an example, non-limiting system 500 in accordance with one or more embodiments described herein. Repetitive description of like elements employed in other embodiments described herein is omitted for sake of brevity.

The system 500 can include the deep neural network 402. The deep neural network 402 can include the input layer 404, the hidden layer 406, the hidden layer 408, the hidden layer 410 and the output layer 412. In an embodiment shown in FIG. 5, the deep neural network 402 can be associated with a backward pass process that traverses through the deep neural network 402 in a backward direction through the output layer 412, the hidden layer 410, the hidden layer 408, the hidden layer 406 and the input layer 404. In an aspect, input data 502 can be provided to the hidden layer 408. For example, the hidden layer 410 can provide the input data 502 to the hidden layer 408. Furthermore, output data 504 can be provided by the hidden layer 408. In an embodiment, the input data 502 can be copied from the memory 106 of the central processing unit 104. For instance, the input data 502 can be stored in the memory 106 of the central processing unit 104 (e.g., during a forward pass process) and the central processing unit 104 can transmit the input data 502 from the memory 106 to the graphics processing unit 102 for employment by the deep neural network 402. In one example, at least a portion of the input data 502 can correspond to the input data 414. In another embodiment, the output data 504 can be discarded after being provided to the hidden layer 406. In certain embodiments, parameter data included in the input data 502 can be copied to the memory 106 of the central processing unit. The parameter data can include one or more learnable parameters determined during the backward pass process associated with the deep neural network 402. In certain embodiments, gradient data included in the output data 504 can be copied to the memory 106 of the central processing unit. The gradient data can include one or more learnable gradient parameters determined during the backward pass process associated with the deep neural network 402. As such, at least a portion of data from a forward pass process associated with the deep neural network 402 can be reused during a backward pass process associated with the deep neural network 402. For example, at least a portion of data from a forward pass process associated with the deep neural network 402 can be temporarily stored by the memory 106 of the central processing unit 104 until the data is needed during a backward pass process associated with the deep neural network 402. Furthermore, the memory 106 of the central processing unit 104 can be employed as a cache and/or a temporary storage location for the graphics processing unit 102.

Additionally, it is to be appreciated that the system 500 can provide various advantages as compared to conventional deep learning techniques. The system 500 can also provide various solutions to problems associated with conventional deep learning techniques. For instance, an amount of time to perform a deep learning process can be reduced by employing the system 500. Furthermore, an amount of computational resources employed to perform a deep learning process can be reduced by employing the system 500. Accuracy of a deep learning process can also be improved by employing the system 500. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 500.

Figure 6:
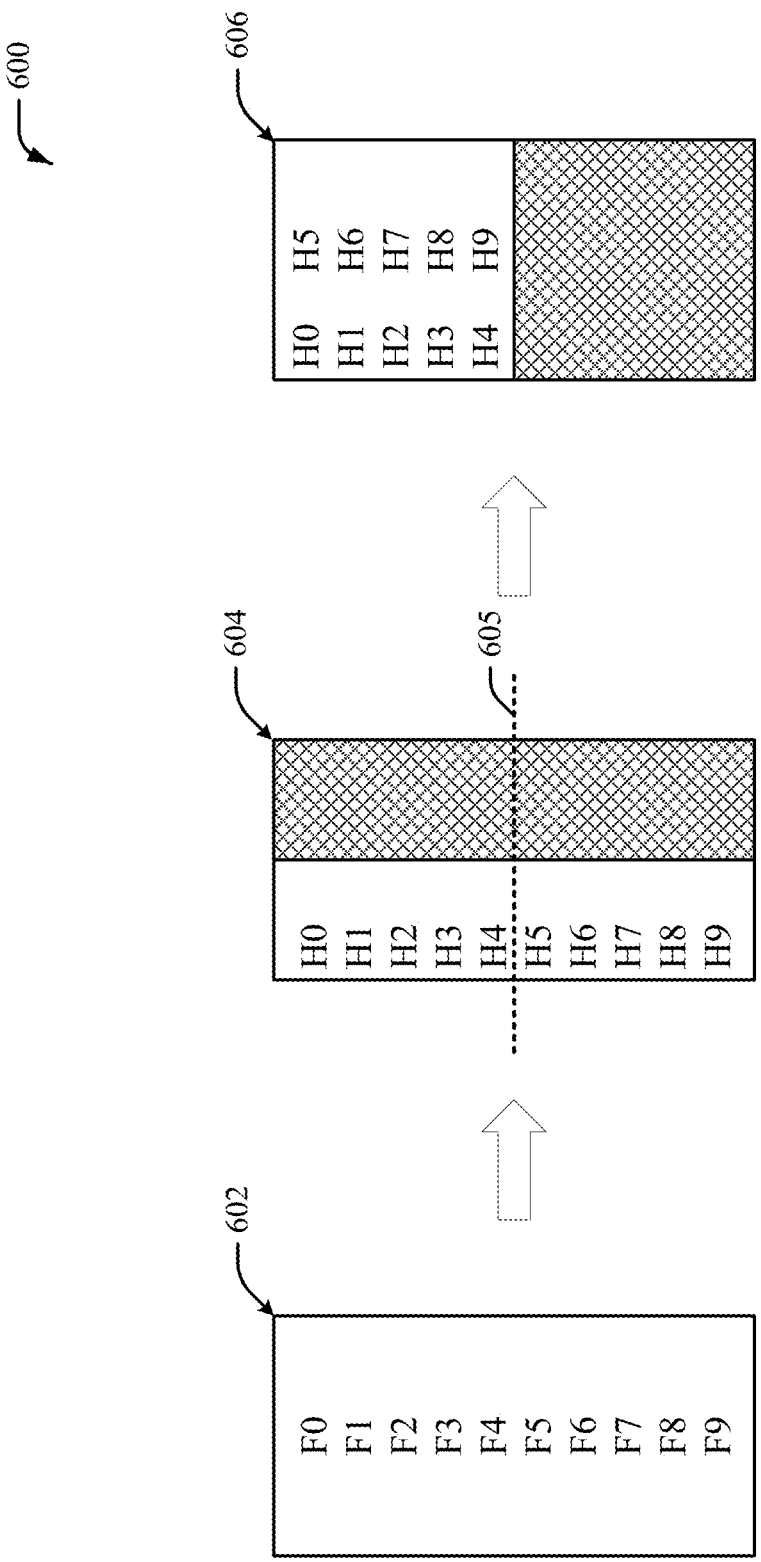
FIG. 6 illustrates an example, non-limiting system associated with data compression in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 includes data 602. The data 602 can correspond to data generated by the graphics processing unit 102. For example, the data 602 can be data provided to and/or generated by a layer in a deep neural network (e.g., the deep neural network 110, the deep neural network 402, etc.) executed by the graphics processing unit 102. The data 602 can include a set of data elements F0-F9. Furthermore, in an example, the data 602 can be formatted as a 32-bit data structure. The data 602 can be modified to generate data 604. The data 604 can be, for example, a 16-bit data structure. For instance, the set of data elements F0-F9 can be modified to generate a set of data elements H0-H9 that are formatted as half precision floats as compared to the set of data elements F0-F9. As such, bit reduction associated with the set of data elements F0-F9 can be performed to generate the set of data elements H0-H9. Additionally, the data 604 can be modified to generate data 606. The data 606 can be a compressed version of the data 604. For example, the set of data elements H0-H9 can be rearranged to provide the data 606. The data 606 can be an encoded version of the data 602 and/or the data 604 that includes a smaller size than the data 602 and/or the data 604. In an embodiment, the data 606 can correspond to data transmitted between the graphics processing unit 102 and the central processing unit 104. In one example, the data 606 can correspond to the input data 414 and/or the input data 502. In another example, the data 606 can correspond to the gradient data of the output data 504. In an embodiment, the data 606 can be formatted in a half-precision floating-point format and/or a compressed format. In certain embodiments, a cutline 605 can be formed between data elements (e.g., data element H4 and data element H5) to indicate location to form a size for the data 606. For instance, the cutline 605 can indicate a location to reorder the data 604 into the data 606. In one example, the data 604 can be reordered to fill empty memory space (e.g., an empty memory partition). In an aspect, the data 606 can be a compressed version of the data 602 to facilitate a reduced transfer time between the graphics processing unit 102 and the central processing unit 104. In an embodiment, the graphics processing unit 102 can generate the data 606 (e.g., the compressed version of the data 602). Additionally, in certain embodiments, the graphics processing unit 102 can reconstruct the data 602 from the data 606 in response to receiving the data 606 from the central processing unit 104.

Additionally, it is to be appreciated that the system 600 can provide various advantages as compared to conventional deep learning techniques. The system 600 can also provide various solutions to problems associated with conventional deep learning techniques. For instance, an amount of time to perform a deep learning process can be reduced by employing the system 600. Furthermore, an amount of computational resources employed to perform a deep learning process can be reduced by employing the system 600. Accuracy of a deep learning process can also be improved by employing the system 600. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 600.

Figure 7:
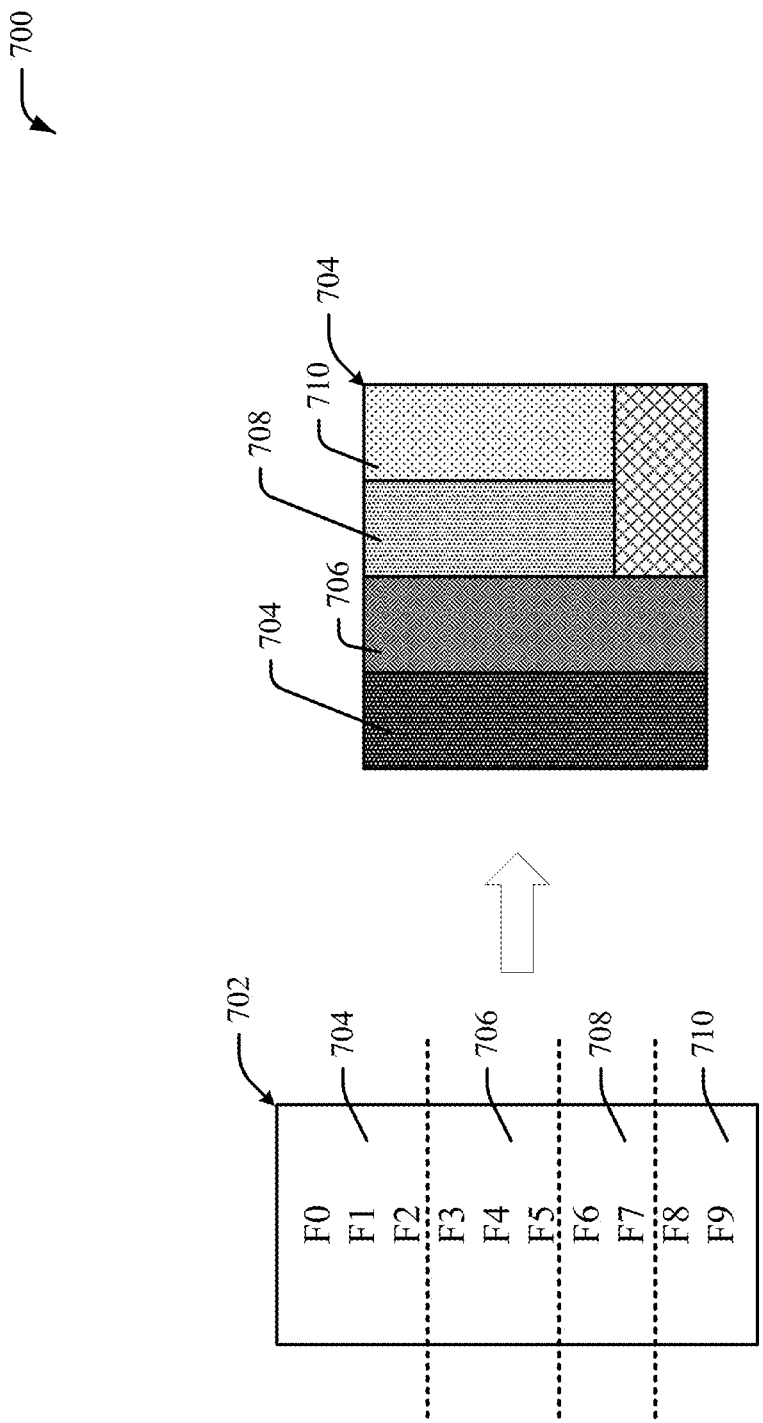
FIG. 7 illustrates another example, non-limiting system associated with data compression in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 includes data 702. The data 702 can correspond to data generated by the graphics processing unit 102. For example, the data 702 can be data provided to and/or generated by a layer in a deep neural network (e.g., the deep neural network 110, the deep neural network 402, etc.) executed by the graphics processing unit 102. The data 702 can include a set of data elements F0-F9. Furthermore, in an example, the data 702 can be formatted as a 32-bit data structure. The data 702 can be modified to generate data 704. The data 704 can be, for example, a compressed version of the data 702. In an aspect, the data 702 can be divided into a data section 704, a data section 706, a data section 708 and a data section 710. The data section 704 can include a first set of data elements F0-F2, the data section 706 can include a second set of data elements F3-F5, the data section 708 can include a third set of data elements F6-F7, and the data section 710 can include a fourth set of data elements F8-F9. Furthermore, the data section 704, the data section 706, the data section 708 and/or the data section 710 can be reformatted and/or compressed to generate the data 704. The data 704 can be an encoded version of the data 702 that includes a smaller size than the data 702. In an embodiment, the data 704 can correspond to data transmitted between the graphics processing unit 102 and the central processing unit 104. In one example, the data 704 can correspond to the input data 414 and/or the input data 502. In another example, the data 704 can correspond to the gradient data of the output data 504. In an aspect, the data 704 can be a compressed version of the data 702 to facilitate a reduced transfer time between the graphics processing unit 102 and the central processing unit 104. In an embodiment, the graphics processing unit 102 can generate the data 704 (e.g., the compressed version of the data 702). Additionally, in certain embodiments, the graphics processing unit 102 can reconstruct the data 702 from the data 704 in response to receiving the data 704 from the central processing unit 104.

Additionally, it is to be appreciated that the system 700 can provide various advantages as compared to conventional deep learning techniques. The system 700 can also provide various solutions to problems associated with conventional deep learning techniques. For instance, an amount of time to perform a deep learning process can be reduced by employing the system 700. Furthermore, an amount of computational resources employed to perform a deep learning process can be reduced by employing the system 700. Accuracy of a deep learning process can also be improved by employing the system 700. Moreover, quality of a graphics processing unit associated with a deep learning process can be improved, performance a graphics processing unit associated with a deep learning process can be improved, efficiency of a graphics processing unit associated with a deep learning process can be improved, timing characteristics of a graphics processing unit associated with a deep learning process can be improved, power characteristics of a graphics processing unit associated with a deep learning process can be improved, and/or another characteristic of a graphics processing unit associated with a deep learning process can be improved by employing the system 700.

Figure 8:
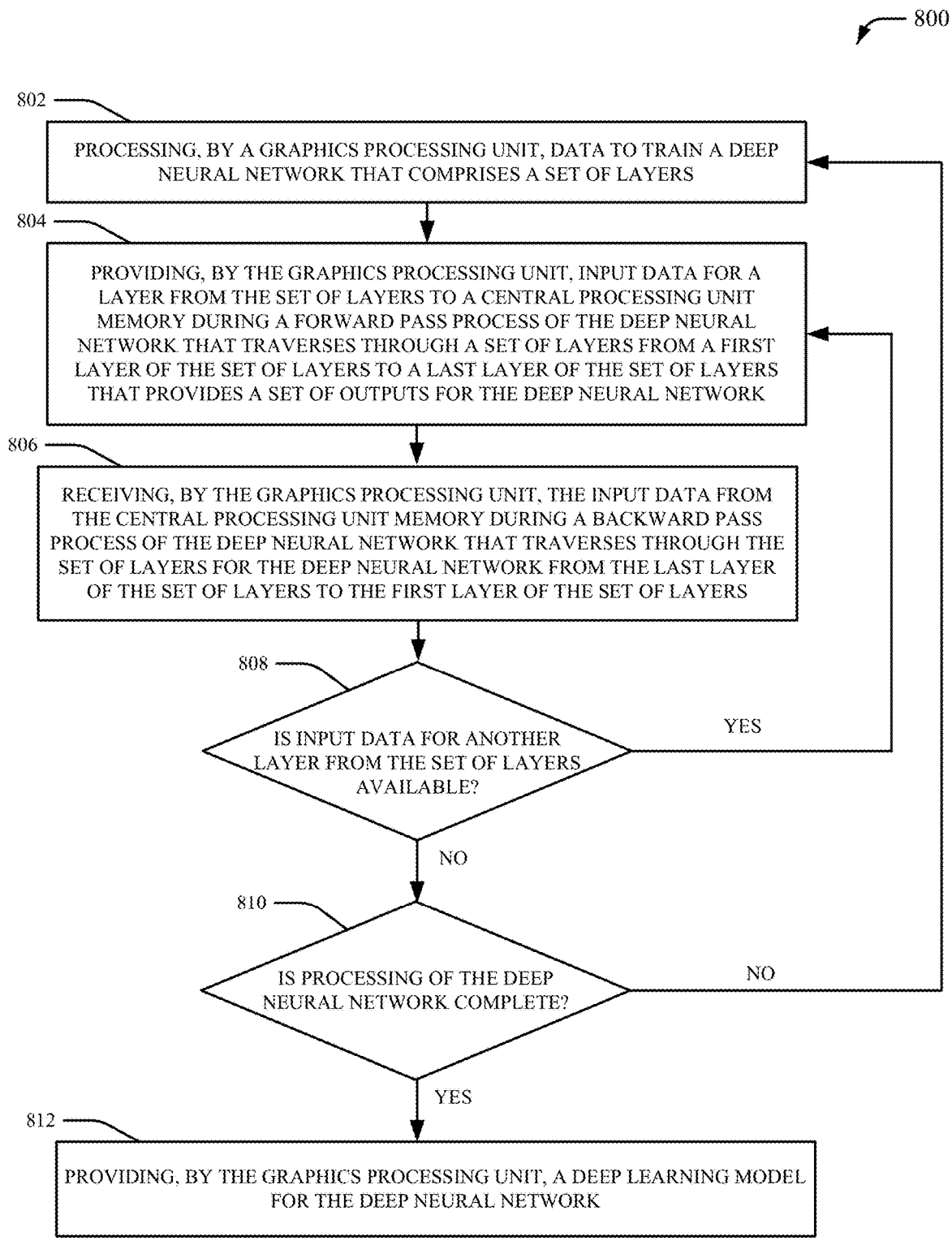
FIG. 8 illustrates a flow diagram of an example, non-limiting computer-implemented method for facilitating model support in deep learning in accordance with one or more embodiments described herein.

FIG. 8 illustrates a flow diagram of an example, non-limiting computer-implemented method 800 for providing model support in deep learning in accordance with one or more embodiments described herein. At 802, data is processed, by a graphics processing unit (e.g., graphics processing unit 102), to train a deep neural network that comprises a set of layers. For example, data can be processed to configure the deep neural network to perform a particular task (e.g., identify a particular classification) associated with data. In an aspect, a set of weights for the deep neural network can be modified and/or determined during the training of the deep neural network. The deep neural network can be an artificial neural network that includes a set of layers. The set of layers of the deep neural network can include, for example, an input layer, a set of hidden layers, and an output layer. The input layer of the deep neural network can include a set of artificial neurons that process data inputted into the deep neural network. In an aspect, the input layer of the deep neural network can process data inputted into the deep neural network based on a set of weights. The set of hidden layers of the deep neural network can be located between the input layer and the output layer. The set of hidden layers of the deep neural network can include one or more hidden layers. Furthermore, the set of hidden layers of the deep neural network can include a set of artificial neurons that process data provided by the input layer. In an aspect a hidden layer from the set of hidden layers can process data provided by a previous hidden layer in the set of layers. The output layer of the deep neural network can include a set of artificial neurons that process data provided by the set of hidden layers. Furthermore, the output layer of the deep neural network can provide a set of outputs for the deep neural network. In another aspect, the deep neural network can be a deep learning model that includes a logic structure that analyzes data similar to a human brain structure.

At 804, input data for a layer from the set of layers is provided, by the graphics processing unit (e.g., graphics processing unit 102), to a central processing unit memory during a forward pass process of the deep neural network that traverses through a set of layers from a first layer of the set of layers to a last layer of the set of layers that provides a set of outputs for the deep neural network. For example, input data for a layer from the set of layers can be temporarily stored by the central processing unit memory during the forward pass process of the deep neural network. In an embodiment, the input data can be provided to the central processing unit memory via a compression scheme. In one example, the input data can be provided to the central processing unit memory via a half-precision floating-point format.

At 806, the input data from the central processing unit memory is received, by the graphics processing unit (e.g., graphics processing unit 102), during a backward pass process of the deep neural network that traverses through the set of layers for the deep neural network from the last layer of the set of layers to the first layer of the set of layers. For example, the input data that is temporarily stored by the central processing unit memory can be transmitted to the graphics processing unit during the backward pass process of the deep neural network. In an embodiment, the input data can be provided to the graphics processing unit memory via a compression scheme. In one example, the input data can be provided to the graphics processing unit memory via a half-precision floating-point format.

At 808, it is determined whether input data from another layer from the set of layers is available. If yes, the computer-implemented method 800 returns to 804. If no, the computer-implemented method 800 proceeds to 810.

At 810, it is determined whether processing of the deep neural network is complete. If no, the computer-implemented method 800 returns to 802. If yes, the computer-implemented method 800 proceeds to 812.

At 812, a deep learning model for the deep neural network is provided, by the graphics processing unit (e.g., graphics processing unit 102). The deep learning model can include, for example, a logic structure and/or a set of weights for the deep neural network.

In certain embodiments, the computer-implemented method 800 can additionally or alternatively include storing, by the graphics processing unit and during the forward pass process, output data from the layer of the deep neural network in a memory associated with the graphics processing unit. In certain embodiments, the computer-implemented method 800 can additionally or alternatively include providing, by the graphics processing unit and during a backward pass process of the deep neural network, gradient data from a layer of the deep neural network to the central processing unit memory. In certain embodiments, the computer-implemented method 800 can additionally or alternatively include receiving, by the graphics processing unit and during a backward pass process of the deep neural network, parameter data for a layer of the deep neural network from the central processing unit memory.

Figure 9:
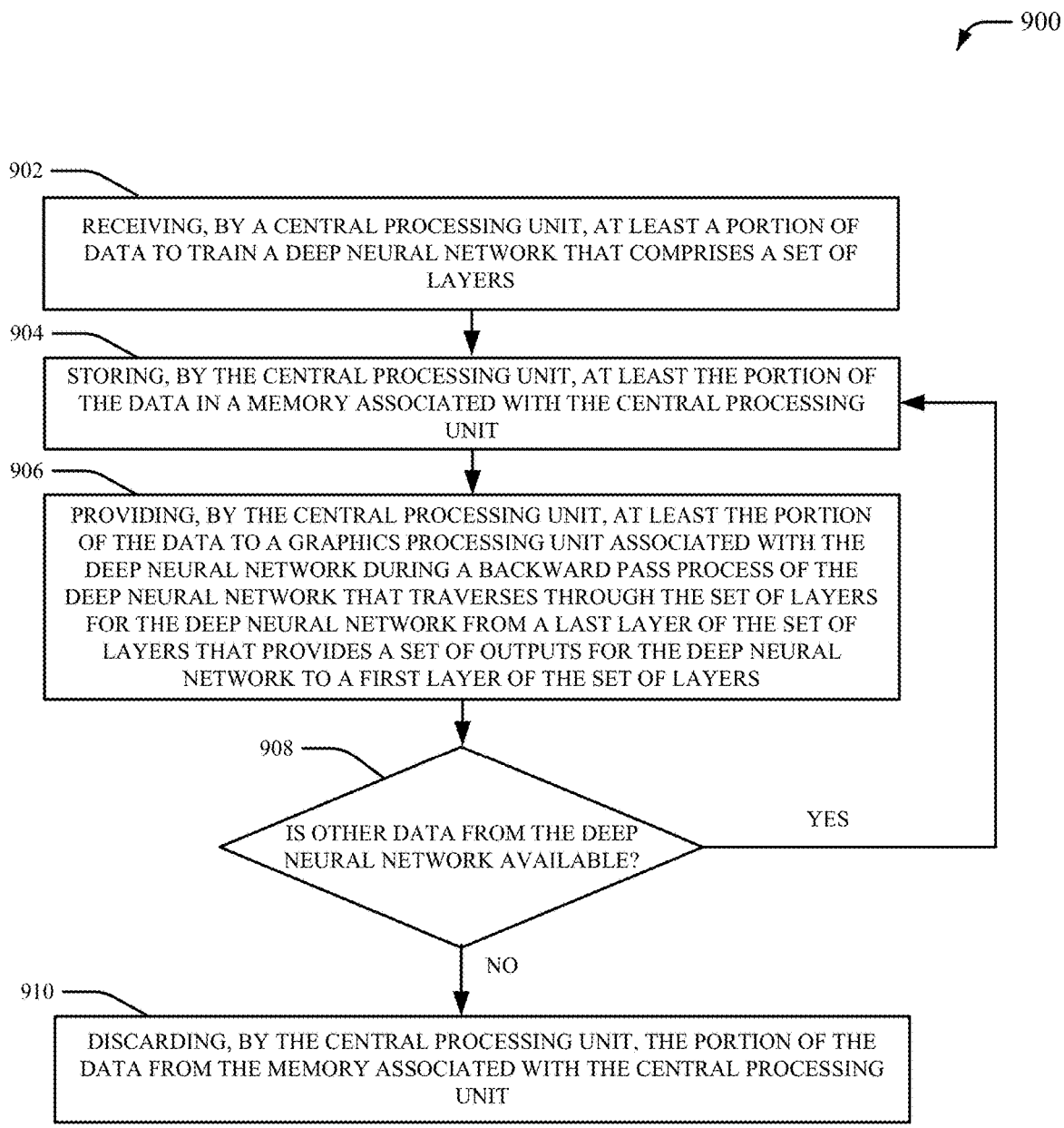
FIG. 9 illustrates a flow diagram of another example, non-limiting computer-implemented method for facilitating model support in deep learning in accordance with one or more embodiments described herein.

FIG. 9 illustrates a flow diagram of an example, non-limiting computer-implemented method 900 for providing model support in deep learning in accordance with one or more embodiments described herein. At 902, at least a portion of data to train a deep neural network that comprises a set of layers is received, by a central processing unit (e.g., by central processing unit 104). For example, the portion of the data can be employed by the deep neural network to configure the deep neural network to perform a particular task (e.g., identify a particular classification) associated with data. In an aspect, a set of weights for the deep neural network can be modified and/or determined during the training of the deep neural network. The deep neural network can be an artificial neural network that includes a set of layers. The set of layers of the deep neural network can include, for example, an input layer, a set of hidden layers, and an output layer. The input layer of the deep neural network can include a set of artificial neurons that process data inputted into the deep neural network. In an aspect, the input layer of the deep neural network can process data inputted into the deep neural network based on a set of weights. The set of hidden layers of the deep neural network can be located between the input layer and the output layer. The set of hidden layers of the deep neural network can include one or more hidden layers. Furthermore, the set of hidden layers of the deep neural network can include a set of artificial neurons that process data provided by the input layer. In an aspect a hidden layer from the set of hidden layers can process data provided by a previous hidden layer in the set of layers. The output layer of the deep neural network can include a set of artificial neurons that process data provided by the set of hidden layers. Furthermore, the output layer of the deep neural network can provide a set of outputs for the deep neural network. In another aspect, the deep neural network can be a deep learning model that includes a logic structure that analyzes data similar to a human brain structure.

At 904, at least the portion of the data is stored, by the central processing unit (e.g., by central processing unit 104), in a memory associated with the central processing unit. For example, at least the portion of the data can be temporarily stored by the memory associated with the central processing unit during a forward pass process of the deep neural network. The forward pass process of the deep neural network can traverse through a set of layers for the deep neural network from a first layer of the set of layers to a last layer of the set of layers that provides a set of outputs for the deep neural network. In an embodiment, at least the portion of the data can be provided to the memory associated with the central processing unit via a compression scheme. In one example, at least the portion of the data can be provided to the memory associated with the central processing unit via a half-precision floating-point format.

At 906, at least the portion of the data is provided, by the central processing unit (e.g., by central processing unit 104), to a graphics processing unit associated with the deep neural network during a backward pass process of the deep neural network that traverses through the set of layers for the deep neural network from a last layer of the set of layers that provides a set of outputs for the deep neural network to a first layer of the set of layers. In an embodiment, at least the portion of the data can be provided to the graphics processing unit via a compression scheme. In one example, at least the portion of the data can be provided to the graphics processing unit via a half-precision floating-point format.

At 908, it is determined whether other data from the deep neural network is available. If yes, the computer-implemented method 900 returns to 904. If no, the computer-implemented method 900 proceeds to 910.

At 910, the portion of the data from the memory associated with the central processing unit is discarded, by the central processing unit (e.g., by central processing unit 104). For example, the portion of the data can be erased from the memory in response to a determination that the portion of the data is transmitted to the graphics processing unit.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least performing a deep learning process and generation of a deep learning model are established from a combination of electrical and mechanical components and circuitry, a human is unable to replicate or perform processing performed by a graphics processing unit (e.g., the graphics processing unit 102) and/or a central processing (e.g., the central processing unit 104) disclosed herein. Furthermore, a human is unable to compress data associated with a deep learning process that is transmitted between a graphics processing unit (e.g., the graphics processing unit 102) and a central processing unit (e.g., the central processing unit 104).

Figure 10:
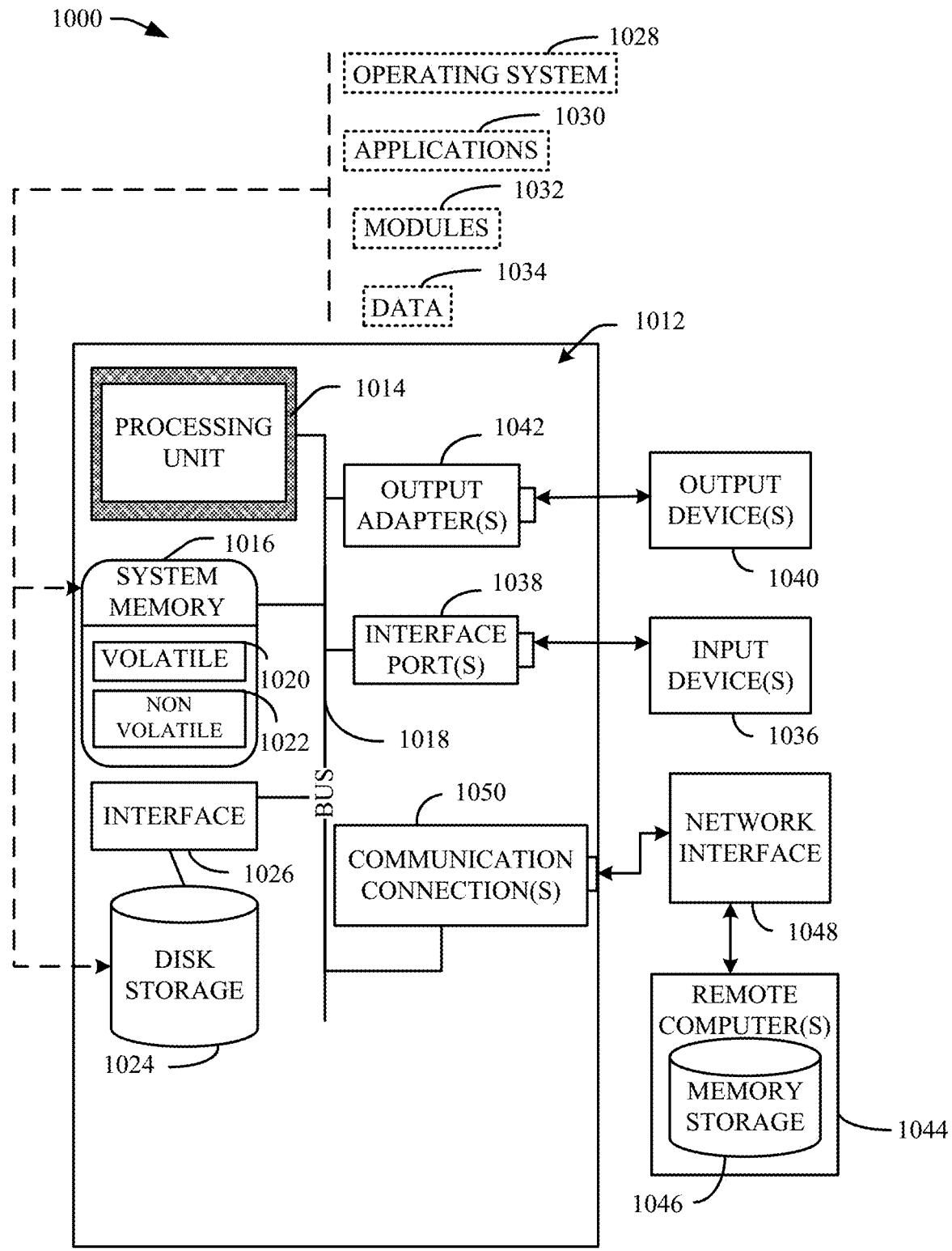
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A graphics processing unit, comprising:
   a graphics processing unit cache memory,
      wherein the graphics processing unit is communicatively coupled to a central processing unit comprising a central processing unit cache memory,
      wherein the graphics processing unit, during a forward pass process of training a deep neural network that traverses through a set of layers of the deep neural network from a first layer of the set of layers to a last layer of the set of layers, transmits, to the central processing unit for storage in the central processing unit cache memory, data from the graphics processing unit cache memory employed for the training by an intermediate layer of the set of layers between the first layer and the last layer, and
      wherein the graphics processing unit has determined that at least a portion of the data will be employed by the intermediate layer during a backward pass process of training the deep neural network that traverses from the last layer to the first layer.

2. The graphics processing unit of claim 1, wherein the graphics processing unit receives, from the central processing unit, during the backward pass process, at least the portion of the data.

3. The graphics processing unit of claim 1, wherein the intermediate layer employs, during the backward pass process, at least the portion of the data.

4. The graphics processing unit of claim 1, wherein the graphics processing unit transmits the data to the central processing unit using a compression scheme.

5. The graphics processing unit of claim 1, wherein the graphics processing unit transmits the data to the central processing unit using a half-precision floating-point format.

6. The graphics processing unit of claim 1, wherein the data comprises gradient data.

7. The graphics processing unit of claim 1, wherein the data comprises parameter data.

8. A computer-implemented method, comprising:
   training, by a graphics processing unit using a graphics processing unit cache memory of the graphics processing unit, a deep neural network that comprises a set of layers, wherein the training comprises:
      determining, by the graphics processing unit, during a forward pass process of training the deep neural network that traverses through the set of layers from a first layer of the set of layers to a last layer of the set of layers, that data from the graphics processing unit cache memory employed for the training by an intermediate layer of the set of layers between the first layer and the last layer, will be employed by the intermediate layer during a backward pass process of training the deep neural network that traverses from the last layer to the first layer; and
      transmitting, by the graphics processing unit during the forward pass process, the data to a central processing unit for storage in a central processing unit cache memory of the central processing unit.

9. The computer-implemented method of claim 8, receiving, by the graphics processing unit, from the central processing unit, the data during the backward pass process.

10. The computer-implemented method of claim 8, employing, by the graphics processing unit, via the intermediate layer, the data during the backward pass process.

11. The computer-implemented method of claim 8, wherein the graphics processing unit transmits the data to the central processing unit using a compression scheme.

12. The computer-implemented method of claim 8, wherein the graphics processing unit transmits the data to the central processing unit using a half-precision floating-point format.

13. The computer-implemented method of claim 8, wherein the data comprises gradient data.

14. The computer-implemented method of claim 8, wherein the data comprises parameter data.

15. A computer program product for model support in deep learning, the computer program product comprising a computer readable storage medium having program instructions embodied therewith, the program instructions executable by a graphics processing unit to cause the graphics processing unit to:
  train, using a graphics processing unit cache memory of the graphics processing unit, a deep neural network that comprises a set of layers, wherein the training comprises:
    a determination, during a forward pass process of training the deep neural network that traverses through the set of layers from a first layer of the set of layers to a last layer of the set of layers, that data from the graphics processing unit cache memory employed for the training by an intermediate layer of the set of layers between the first layer and the last layer, will be employed by the intermediate layer during a backward pass process of training the deep neural network that traverses from the last layer to the first layer; and
    a transmission, during the forward pass process, of the data to a central processing unit for storage in a central processing unit cache memory of the central processing unit.

16. The computer program product of claim 15, wherein the program instructions are further executable by the graphics processing unit to cause the graphics processing unit to:
  receive, from the central processing unit, the data during the backward pass process.

17. The computer program product of claim 15, wherein the program instructions are further executable by the graphics processing unit to cause the graphics processing unit to:
  employ, via the intermediate layer, the data during the backward pass process.

18. The computer program product of claim 15, wherein the graphics processing unit transmits the data to the central processing unit using a compression scheme.

19. The computer program product of claim 15, wherein the graphics processing unit transmits the data to the central processing unit using a half-precision floating-point format.

20. The computer program product of claim 15, wherein the data comprises gradient data.

\* \* \* \* \*